(12) United States Patent
Porcher et al.

(10) Patent No.: US 11,522,399 B2
(45) Date of Patent: Dec. 6, 2022

(54) ROTOR HAVING AN INJECTED CAGE

(71) Applicant: MOTEURS LEROY-SOMER, Angouleme (FR)

(72) Inventors: Sébastien Porcher, Saint Palais de Blaye (FR); Thierry Visse, Bunzac (FR); Mike McClelland, Champniers (FR); François Turcat, Montignac sur Charente (FR)

(73) Assignee: MOTEURS LEROY-SOMER, Angouleme (FR)

( * ) Notice: Subject to any disclaimer, the term of this patent is extended or adjusted under 35 U.S.C. 154(b) by 168 days.

(21) Appl. No.: 16/635,818

(22) PCT Filed: Jul. 30, 2018

(86) PCT No.: PCT/EP2018/070557
§ 371 (c)(1),
(2) Date: Jan. 31, 2020

(87) PCT Pub. No.: WO2019/025344
PCT Pub. Date: Feb. 7, 2019

(65) Prior Publication Data
US 2021/0135524 A1    May 6, 2021

(30) Foreign Application Priority Data

Jul. 31, 2017 (FR) ...................................... 1757298

(51) Int. Cl.
*H02K 17/16* (2006.01)
*H02K 1/28* (2006.01)
(Continued)

(52) U.S. Cl.
CPC ................. *H02K 3/12* (2013.01); *H02K 1/02* (2013.01); *H02K 1/28* (2013.01); *H02K 2203/09* (2013.01)

(58) Field of Classification Search
CPC .. H02K 3/12; H02K 1/02; H02K 1/28; H02K 2203/09; H02K 2213/03; H02K 17/165;
(Continued)

(56) References Cited

U.S. PATENT DOCUMENTS 3,832,583 A * 8/1974 Chang ...................... H02K 3/48
310/201
6,177,750 B1 * 1/2001 Tompkin .................. H02K 1/28
310/211
(Continued)

FOREIGN PATENT DOCUMENTS

CN          1925280 A      3/2007
DE    102010041796 A1      4/2012
(Continued)

OTHER PUBLICATIONS

Oct. 4, 2018 International Search Report issued in International Patent Application No. PCT/EP2018/070557.
Sep. 22, 2021 Office Action issued in U.S. Appl. No. 16/635,604.

*Primary Examiner* — Thomas Truong
(74) *Attorney, Agent, or Firm* — Oliff PLC

(57) ABSTRACT

A rotor for a rotary electric machine, including: a stack of magnetic laminations each having openings, the superposition of these openings within the stack forming slots, at least some of the openings having, on at least part of their periphery, friction reliefs, electrically conducting bars made of a first material, received in at least part of the slots and coming to bear via at least one principal face against said reliefs.

15 Claims, 3 Drawing Sheets

(51) Int. Cl.
*H02K 3/12* (2006.01)
*H02K 1/02* (2006.01)

(58) Field of Classification Search
CPC ...... H02K 17/205; H02K 1/265; H02K 17/00; H02K 17/44
See application file for complete search history.

(56) References Cited

U.S. PATENT DOCUMENTS

| | | | |
|---|---|---|---|
| 6,877,210 B2 | 4/2005 | Hsu | |
| 8,684,257 B2 | 4/2014 | Osborne et al. | |
| 9,071,112 B2 | 6/2015 | Maeda et al. | |
| 10,476,361 B2 | 11/2019 | Brandl et al. | |
| 2011/0140565 A1* | 6/2011 | Yabe | H02K 17/185 310/211 |
| 2011/0291516 A1 | 12/2011 | Alexander et al. | |
| 2011/0316380 A1 | 12/2011 | Buttner et al. | |
| 2013/0187512 A1* | 7/2013 | Buttner | H02K 15/0012 310/211 |
| 2014/0252910 A1 | 9/2014 | Kunihiro et al. | |
| 2015/0222164 A1 | 8/2015 | Hippen et al. | |
| 2015/0295483 A1* | 10/2015 | Brandl | H02K 1/26 310/211 |
| 2018/0006537 A1* | 1/2018 | Terasawa | H02K 15/0012 |
| 2018/0123432 A1* | 5/2018 | Scherer | H02K 17/22 |

FOREIGN PATENT DOCUMENTS

| | | |
|---|---|---|
| EP | 2 728 718 A1 | 5/2014 |
| JP | H10-28360 A | 1/1998 |
| JP | H10-234166 A | 9/1998 |
| JP | H11-206080 A | 7/1999 |
| JP | 2005-278373 A | 10/2005 |
| JP | 2007-295756 A | 11/2007 |
| WO | 2009/038678 A1 | 3/2009 |
| WO | 2010/100007 A1 | 9/2010 |
| WO | 2011/015494 A1 | 2/2011 |
| WO | 2011/020788 A2 | 2/2011 |
| WO | 2012/041943 A2 | 4/2012 |
| WO | 2014/067792 A1 | 5/2014 |
| WO | 2015/071156 A1 | 5/2015 |

* cited by examiner

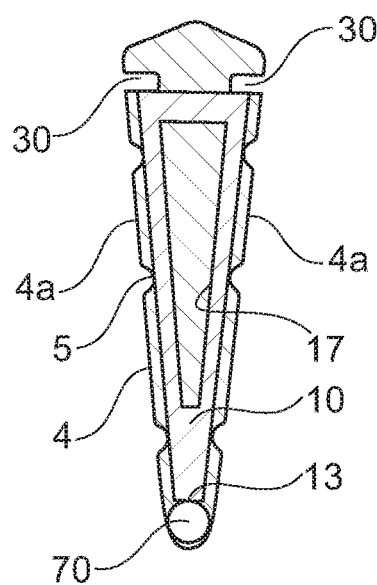
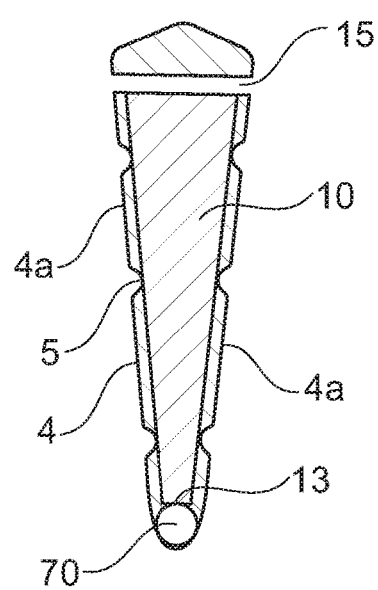
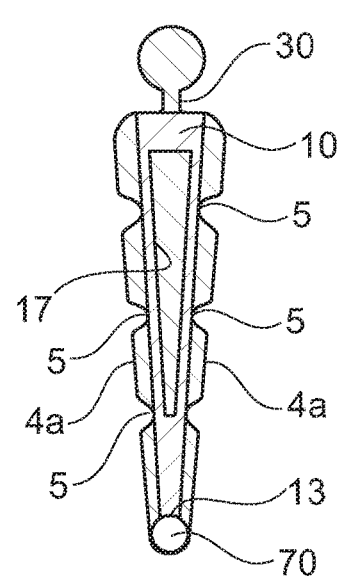
Fig. 4A    Fig. 4B    Fig. 4C
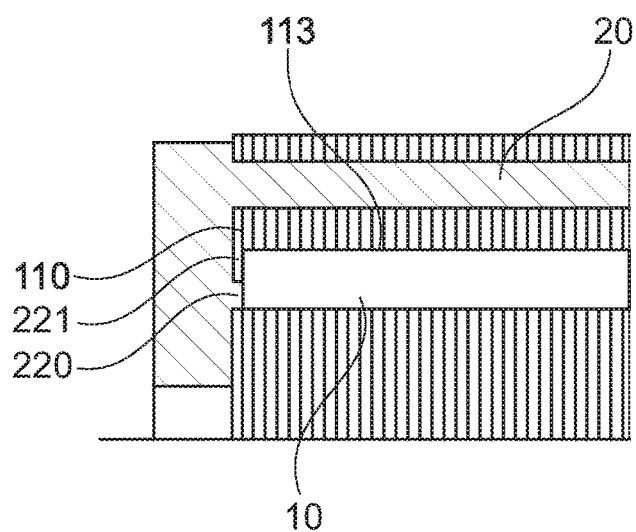
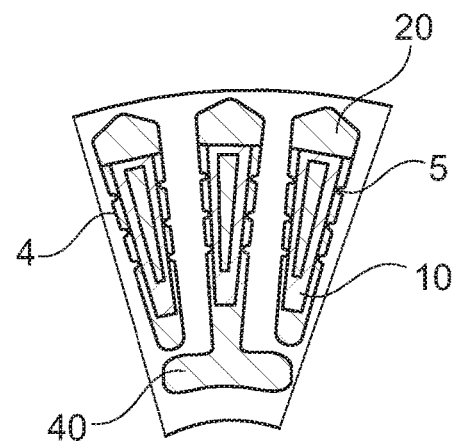
Fig. 6A
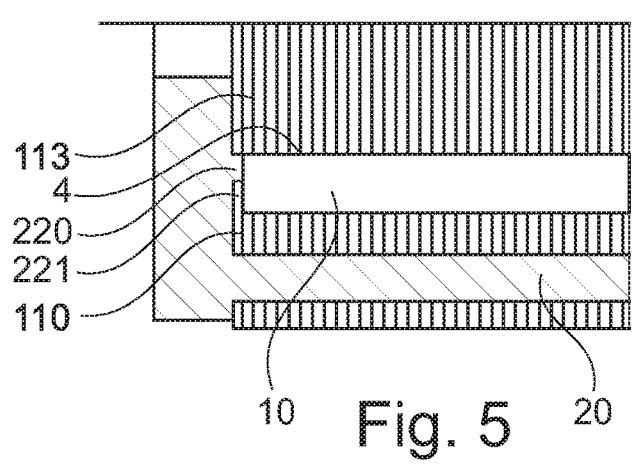
Fig. 5
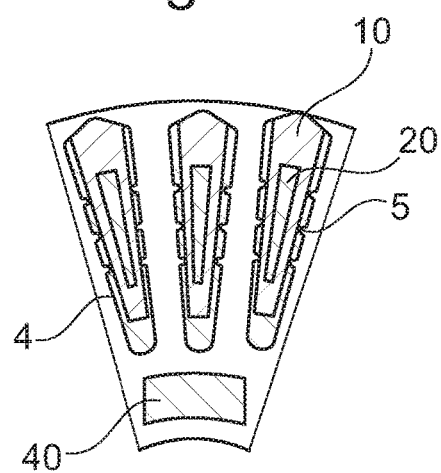
Fig. 6B

ROTOR HAVING AN INJECTED CAGE

The present invention relates to rotary electric machines, and more particularly to the rotors of such machines.

BACKGROUND

Asynchronous electric motors conventionally comprise a stack of magnetic laminations, with slots passing through this laminations stack. Aluminum is injected under pressure to form bars which are connected to the outside of the laminations stack by short-circuiting rings.

In order to improve electrical performance, it may prove advantageous to reduce the electrical resistivity of the bars still further by replacing the aluminum with copper. However, because the melting point of copper is far higher than that of aluminum, it becomes difficult to inject copper into the slots.

One known solution thus consists in introducing conducting copper bars into the slots and in injecting aluminum under pressure to fill the space left empty by the bars inside the slots.

Applications WO2011015494, WO2010100007, WO2009038678, US2011291516, WO2014067792, WO2011020788, WO2015071156, WO2012041943, JPH10234166, CN1925280, JPH11206080, JP2005278373, and JPH1028360 describe rotors of which the laminations stacks have slots accepting copper bars and into which aluminum is injected under pressure.

Application WO2012041943 discloses a caged rotor the conducting bars of which have grooves intended to make it easier for the bars to move toward the bottom of the slots under the effect of the injection pressure. This application also indicates that the grooves encourage the retention of the short-circuiting rings.

Application CN1925280 discloses a rotor having slots which comprise reliefs in order to hold the bars in the bottoms of the slots.

EP 2 728 718 discloses a rotor comprising conducting bars positioned in slots. These slots comprise protuberances to allow the bars to be positioned via corresponding recesses in the latter.

DE 10 2010 041796 discloses conducting bars comprising grooves on the radial surfaces to make it possible to increase the area of contact between the poured aluminum and the copper bars.

US 2014/252910 discloses conducting bars received in slots formed within a laminations stack. The slots may comprise fixing parts present on the radial surfaces of the slots.

JP 2007/295756 discloses a rotor comprising conducting bars received in slots formed within a laminations stack. The slots may comprise protuberances.

SUMMARY

Injecting aluminum under pressure into the laminations stack presents the problem of holding the bars in the slots during this operation.

The invention seeks to solve this problem and thus further improve rotors comprising bars made from a first electrically conducting material and a second electrically conducting material injected into the slots around these bars.

According to a first aspect of the invention, one subject is a rotor for a rotary electric machine, comprising:
a stack of magnetic laminations each having openings, the superposition of these openings within the stack forming slots, at least some of the openings having, on at least part of their periphery, friction reliefs,
electrically conducting bars made of a first material, received in at least part of the slots and coming to bear via at least one principal face against said reliefs.

By virtue of the invention, it is possible to hold the bars inside the laminations stack effectively. The reliefs may be created very accurately during the cutting of the laminations, and allow a greater tolerance on the cross section of the bars.

In particular, when a second material is injected into the slots around the bars, the latter may remain motionless within the stack. The reliefs may also reduce the force that has to be exerted on the bars in order to insert them into the laminations stack.

The relief may even, by reducing the area of contact between the bars and the laminations, reduce the inter-bar current circulating through the laminations and the corresponding joule-effect energy losses.

The friction reliefs are preferably present on opposite sides of the slots and the conducting bars come to bear against these reliefs via two opposite principal faces.

The friction reliefs may take the form of bosses, preferably extending over substantially the entire radial dimension of a bar. Preferably, the bars do not have corresponding recesses to accept the friction reliefs.

The bosses may have an amplitude of between 0.2 and 0.4 mm.

All the laminations of the stack may be identical. The laminations of the stack may be identical over the entire length of the stack, potentially apart from the laminations at the ends of the stack. That allows better retention of the bars. That also allows for easier lamination management during the production of the rotor.

Preferably, the friction reliefs are not deformable. For example, the friction reliefs are not deformed by the introduction of the bars. The bars, notably made of copper, can be deformed or lacerated by the friction reliefs as they are introduced.

At least one lamination of the stack may have at least one locking relief that comes to bear against a radially exterior end face of a corresponding bar, and, better still, two such reliefs opposite one another, each coming to bear against the same end face.

At least one lamination of the stack may have at least one blocking relief that comes to bear against a radially interior end face of a corresponding bar, this blocking relief preferably being centered on the median plane of the corresponding opening.

Around the bars, the slots are preferably filled with the second electrically conducting material, injected into the slots, and which is preferably not as good a conductor of electricity as the first material. That makes it possible to make the injection of the second material into the slots easier, to limit contact between the magnetic laminations and the bars so as to limit the additional losses, and to reduce the potential level of vibration of the bar within its slot by the bar being bonded/blocked by this second material.

Preferably, the first material is copper and the second material aluminum.

The second material may extend into each slot in the radial direction inwardly and outwardly with respect to the bar contained in this slot.

Preferably, the magnetic laminations contain a magnetic steel, for example silicon steel, with its various grades. The thickness of each lamination is for example comprised between 0.35 mm and 0.65 mm.

For example, the second material comes into contact with the radially inner and radially outer end faces of the bars, at the top and in the bottom of the slots.

Another subject of the invention is a rotary electric machine comprising a rotor according to the invention.

DESCRIPTION OF THE FIGURES

The invention will be able to be better understood from reading the following detailed description of non-limiting exemplary implementations thereof, and from examining the appended drawing, in which:

FIGS. 4A to 4C illustrate nonlimiting alternative forms of embodiment of the slots, FIG. 5 depicts, in a view similar to FIG. 1, an alternative form of a rotor according to the invention, and FIGS. 6A and 6B illustrate alternative forms of embodiment of the laminations.

Rotor

Figure 1:
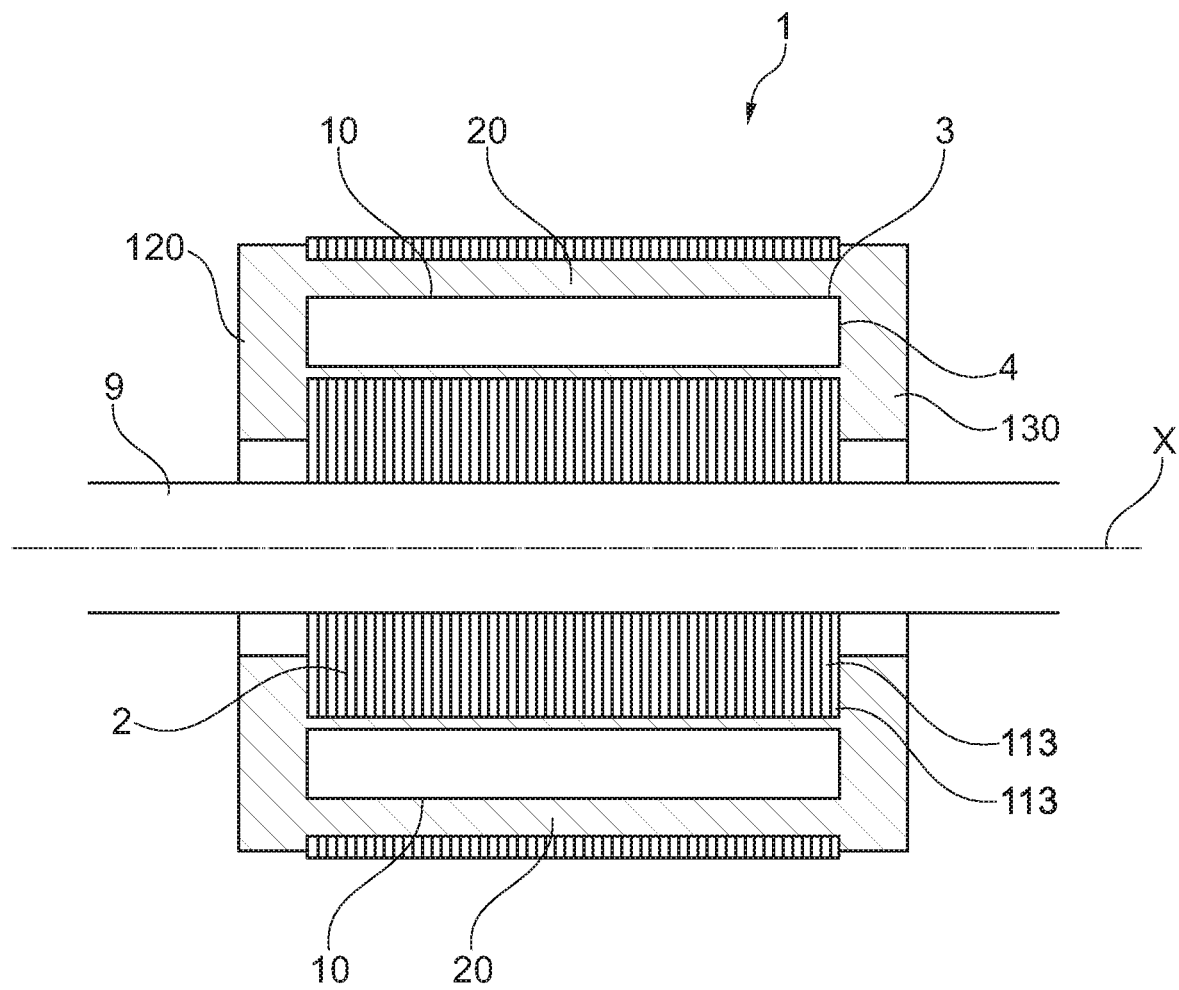
FIG. 1 schematically depicts, in axial section, one example of a rotor according to the invention.

FIG. 1 depicts a rotor 1 according to the invention. This rotor 1 comprises a stack of magnetic laminations 2, which are mounted on a shaft 9, for example made of steel, of axis X.

This stack 2 is formed by the superposition of magnetic laminations 113 in which openings 3 are cut.

The superposition of the openings 3 of the laminations 113 forms, within the stack 2, slots 4 which extend longitudinally from one axial end of the stack 2 to the other. The slots 4 may be straight, which means to say that all the laminations 2 are exactly superposed without any angular offset from one lamination 113 to the next. However, as a preference, the laminations 113 are superposed with a slight angular offset from one lamination to the next so that the longitudinal axes of the slots 4 follow a helical path around the axis of rotation of the rotor, in a way known per se.

In the example illustrated, all the laminations 113 are identical and the openings 3 are identical also, such that the stack 2 comprises slots 4 that are identical. In alternative forms, the stack 2 is formed by assembling laminations 113 which are not strictly all identical when viewed face-on, from the front of the stack 2, such that the cross section of a slot 4 may exhibit a shape which varies when progressing from the front end of the slot 4 to the rear end. In particular, the laminations 113 may be identical when cut, but may be assembled with certain laminations inverted with respect to others, such that they cause the cross section of the slots 4 to evolve when progressing along the axis of rotation.

The rotor 1 comprises copper bars 10, inserted into the slots 4, and a material 20, such as aluminum, injected into the slots 4 in the space left empty by the bars 10.

Short-circuiting rings 120 and 130 are cast in aluminum at the ends of the laminations stack 2. These rings 120 and 130 are of one piece with the aluminum poured into the slots 4.

Slots with Friction Reliefs

In the example of FIGS. 2A to 2E, the slots 4 are produced with bosses 5 on part of their periphery. These bosses are present on the opposite long sides 4a of the slot 4, these long sides extending substantially radially.

The dimensions of the bars 10 are chosen so that these bars bear via their opposite principal faces 11 against the bosses 5, tightly enough that the bars 10 are immobilized by friction within the laminations stack.

In the example illustrated, the bars 10 have a trapezoidal overall cross section and the principal faces 11 are planar and converge toward the center of the rotor. These principal faces 11 come into contact with the bosses 5 over substantially all of their radial dimension.

Figure 3:
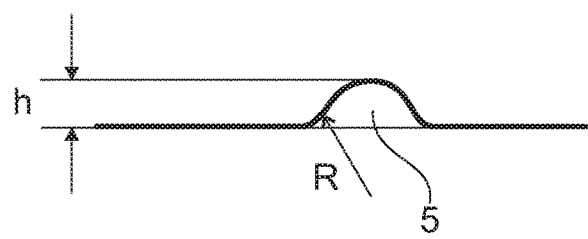
FIG. 3 depicts an embodiment detail of a slot.

As illustrated in FIG. 3, the bosses 5 may have an amplitude of between 0.2 and 0.4 mm, for example of 0.3 mm. The bosses 5 may have a rounded shape with a radius of curvature R at their vertex of between 0.4 and 0.6 mm, for example of 0.5 mm.

Figure 2A:
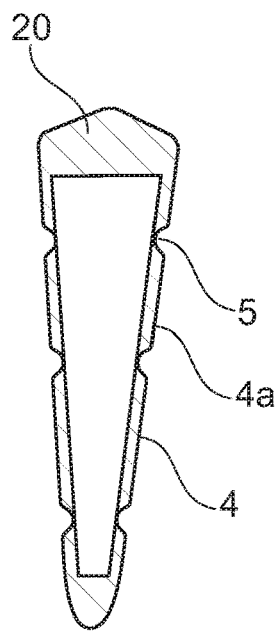
FIGS. 2A to 2E illustrate the alternative forms of embodiment of the slots.

In the example of FIG. 2A in particular, the clamping of the bars 10 within the slot 4 is firm enough that each bar is immobilized both axially in the direction of the axis of rotation of the rotor, and radially. The bars can thus without moving withstand the pressure of the injection of the aluminum 20 into the laminations stack.

Slots with Blocking Reliefs

Figure 2B:
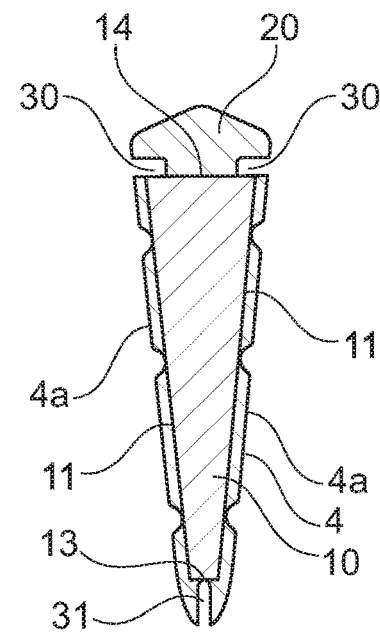
Figures 2C, 2D:
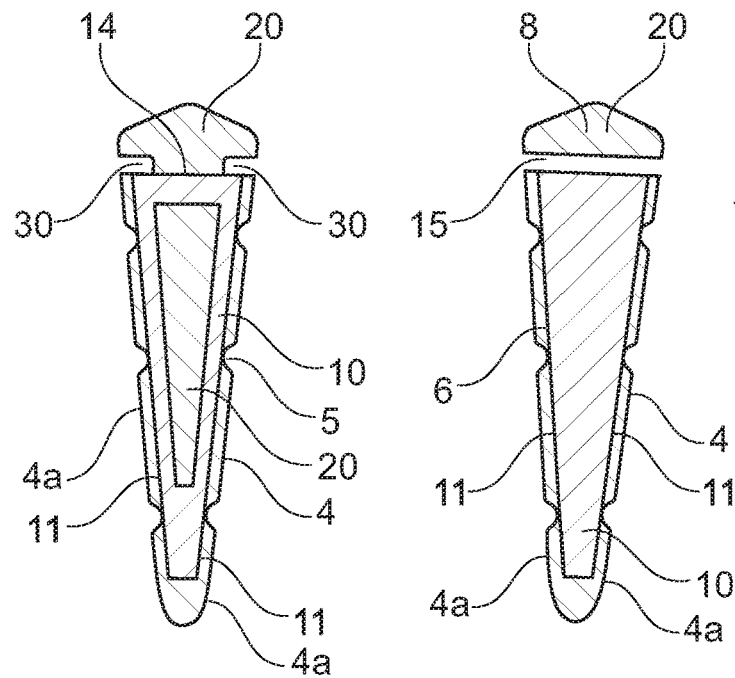

However, it may be desirable to create additional blocking reliefs in at least some of the laminations of the stack, as illustrated in FIGS. 2B and 2C.

In these figures, each lamination 113 has, at each slot 4, two opposite blocking reliefs 30 which are directed toward one another and which come to bear against the radially outer face 14 of the corresponding bar 10.

A blocking relief 31 may also be produced in the bottom of the slot, to come to bear against the radially inner end face 13 of the bar 10, as illustrated in FIG. 2B. This blocking relief 31 may be centered on the median plane M of the opening associated with the slot. In general, each lamination may be cut with openings which each have a shape that is symmetrical with respect to a radial median plane M.

Slots with Separating Reliefs

Figure 2E:
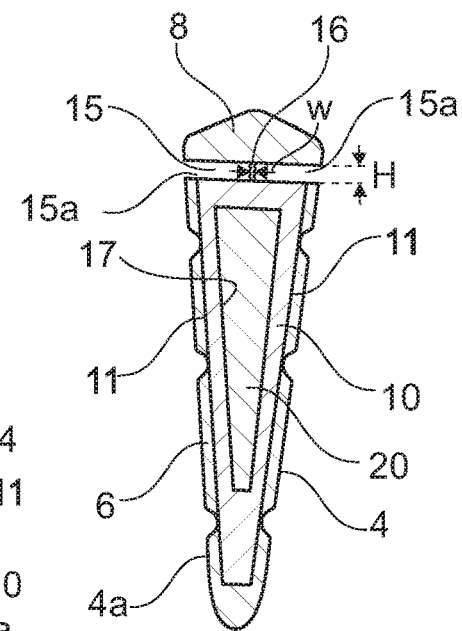

As illustrated in FIGS. 2D and 2E, separating reliefs 15 may extend within the openings and separate the slots 4 into distinct first 6 and second 8 compartments, the first compartments 6 being radially on the inside with respect to the second compartments 8.

The conducting bars 10 made of the first material may be positioned in the first 6 or the second 8 compartments of at least part of the slots 4. The second electrically conducting material, which differs from the first, may then be positioned in the second 8 or the first 6 compartments of these slots 4, the separating reliefs 15 which extend within the openings preventing the first and second materials from coming into contact.

The bars 10 which are introduced into the laminations stack may be held within the corresponding compartments by the separating reliefs 15. These latter are arranged in such a way as to prevent the first and second materials from coming into contact. In this way, potential corrosion phenomena are avoided.

The separating reliefs 15 may be of various shapes, being produced by cutting-out with the material of the magnetic laminations.

For example, the separating reliefs 15 are bridges of material which separate each slot into non-communicating first and second compartments, as illustrated in FIG. 2D.

In the alternative form of FIG. 2E, the separating reliefs 15 consist of projections 15a positioned facing one another and which between them leave a canal 16 that is narrow enough to prevent contact between the first and second materials. For example, when the first compartments are filled with molten aluminum by injection, canals of a width w less than 0.6 mm and a height H less than 2 mm may prevent the aluminum from entering the second compartments through the canals, and vice versa.

One embodiment in which the conducting bars made from the first material are inserted into the first compartments, the first material preferably being copper, the second material being injected into the second compartments, this second material preferably being aluminum, is especially suitable for a machine intended to be driven with a current of fixed frequency. Specifically, when the motor is connected to the mains network, the starting of the motor demands a high inrush current compared with the nominal point. Because the ratio between the starting inrush current and the nominal current is limited by the applicable standards, the objective is to reduce it. On start-up, the part of the slot that generates the electrical resistance is predominantly the top of the slot, near the gap, because of the skin effect. In order to limit this starting current, the resistance of the cage needs to increase. Thus, having the material of greater electrical resistivity closer to the gap makes it possible to reduce the starting current.

One alternative form of embodiment in which the conducting bars made from the first material are inserted into the second compartments, the first material preferably being copper, this second material being injected into the first compartments, this second material preferably being aluminum, is especially suitable for a motor connected to a variator, for variable-speed drive. In this case, the starting current is not a constraint. Locating the material of lower electrical resistivity in the compartment closer to the gap and, if appropriate, introducing an aperture, notably in the form of a slit, on that side of the gap that has no electrically conducting material, makes it possible to reduce the electrical losses. In addition, the presence of a bar in the upper part of the slot prevents the second material from running into the aperture, if present, in the slot on the side of the gap during injection.

Hollow Bars

In the alternative forms illustrated in FIGS. 2C and 2E, the bars are hollow and have a longitudinal interior cavity 17 which is filled with the second material.

The fact that the bars 10 are hollow makes it easier to fill the cavity used for casting the rear short-circuiting ring, when injection is performed from the front.

In addition, the total quantity of copper used can be lower, making it possible to reduce the cost of the machine.

The second material which is injected into the bars is protected from contact with the oxygen of the air by the material of the bars, except at the axial ends of these bars. In this way, phenomena of corrosion at the interface between the first and second materials are limited.

The bars 10 preferably have, in transverse section, a closed contour which may be non-circular.

As a preference, the second material 20 fills the slots also on the outside of the bars, notably when the bars 10 do not occupy the entire cross section of the slots.

The bars 10, whether hollow or not, may extend over the entire radial dimension of the slots. In particular, the bars may have a transverse section which is substantially the same shape as the slots.

As an alternative, the bars 10, whether hollow or not, have a radial dimension which is smaller than that of the slots.

The bars, whether hollow or not, may extend over at least the length of the laminations stack.

All of the slots of the rotor may comprise hollow bars with the second material injected inside. As an alternative, it is possible for certain slots not to comprise a bar, these slots in that case being completely filled with the second conducting material. The rotor for example comprises more slots with bars than slots without bars, or vice versa.

Slots without Bars

In one alternative form, the bars are present in just some of the slots.

The absence of bars in certain slots makes it possible to maintain a greater total cross section for the passage of the injected aluminum, thus making it easier to fill the rear ring when injection is performed from the front.

The presence of bars made from a material with lower electrical resistance, such as copper, in certain slots improves the electrical performance. It is possible, by choosing the number of bars added, to optimize the improvement in performance against the cost of the machine, copper being more expensive than aluminum.

The rotor may comprise more slots with bars than slots without bars. In other alternative forms, the opposite is true, and the rotor comprises more slots without bars than with bars.

There are numerous possible arrangements of the bars within the slots. For example, a slot without a bar and a slot with a bar may be alternated in the circumferential direction. It is also possible in more general terms to have $n_1$ slots without a bar alternating with $n_2$ slots with a bar, $n_1$ and $n_2$ being integers strictly greater than 1.

Secondary Slots

As illustrated in FIGS. 6A and 6B, the openings may form, within the stack, n main slots 4 as defined above and m secondary slots 40, radially on the inside with respect to the main slots, where n and m are non-zero integers and n>m.

Bars 10 made of the first electrically conducting material, preferably copper, are arranged in at least part of the main slots 4 and a second electrically conducting material 20, different from the first, preferably aluminum, is injected into the secondary slots 40.

The secondary slots 40 provide the benefit of a greater passage cross section for the second conducting material 20, during injection. Because the latter material is injected from the front, having a larger passage cross section allows the rear short-circuiting ring to be created without defect.

The secondary slots 40 are separate from the main slots 4 in the example of FIG. 6A.

In the alternative form illustrated in FIG. 6B, each secondary slot 40 communicates with a main slot 4.

Each secondary slot 40 may be centered on a median plane of a main slot 4.

The ratio n/m between the number of main slots 4 and the number of secondary slots 40 is, for example, equal to 2 or 3.

The secondary slots 40 preferably have an angular extent, measured about the center of the laminations stack, that is greater than that of a main slot 40.

Blocking Elements

The machine may comprise pins or rivets 70 inserted in the slots in contact with the bars.

As illustrated in FIGS. 4A to 4C, these pins or rivets 70 are placed in the bottom of the slots 4 to come to bear against the radially inner end face 13 of the bars 10.

The pins or rivets 70 may be of conical shape.

Retaining Lamination

The stack 2 may, as depicted in FIG. 5, comprise at least one retaining lamination 110 at least at one of its axial ends, preferably at each of the axial ends. Some bars 10, better still, all the bars, come to bear against this retaining lamination 110 at one axial end.

The presence of the retaining lamination or retaining laminations 110 provides retention at least at one end of the bars 10, by bearing against the retaining lamination or retaining laminations 110.

At least one retaining lamination 110, preferably each retaining lamination 110, is produced with openings 220 which allow the second material 20 to be injected, through the retaining lamination 110, into the stack 2 of laminations 113. Thus, the presence of the retaining laminations 110 does not excessively hamper the injection of the second material 20, and at the same time contributes to the effective retention of the bars 10 introduced into the slots 4 up to the injection operation.

The retaining lamination or retaining laminations may comprise at least one retention relief 221 at least partially superimposing with the bars 10 in order to retain these axially. This retention relief 221 may be produced in various ways.

In some embodiments, the or each retention relief 221 is formed by two projections facing one another, per slot that receives a bar 10. These projections are superposed with the bars 10. In some alternative forms of embodiment, the or each retention relief 221 comprises a bridge of material per slot that receives a bar 10.

Rotor Manufacture

In order to manufacture the rotor, the laminations 113 may be cut using a press fitted with a punch, or using a laser and openings 3 corresponding to the slots 4 and, where appropriate, the bosses 5, can be formed at the time of cutting.

Next, the laminations 113 are superposed to form the stack 2 and then the bars 10 are inserted into the slots 4 by force. During insertion, the presence of the bosses 5 makes it easier for the bars 10 to advance through the stack 2 of laminations 113 and, where appropriate, pins or rivets 70 are inserted into the bottom of the slots 4 to block the bars 10 in position prior to injection. Once the bars 10 have been fitted, the second material 20, namely the aluminum, can be injected in an injection machine. The short-circuiting rings can be created by casting at the time of injection.

Of course, the invention is not limited to the exemplary embodiments which have just been described.

For example, the slots may have other shapes, as may the bars.

Materials other than copper and aluminum can be used.

The invention claimed is:

1. A rotor for a rotary electric machine, comprising:
a stack of magnetic laminations each having openings, the superposition of these openings within the stack thrilling slots, at least some of the openings having, on at least part of their periphery, friction reliefs,
electrically conducting bars made of a first material, received in at least part of the slots and coming to bear via at least one principal face against said reliefs, the friction reliefs being present on opposite long sides of the slots and the conducting bars coming to bear against these reliefs via two opposite principal faces, the friction reliefs taking the form of bosses, each principal face of the bars coming to bear against the bosses, the bosses having an amplitude, measured perpendicular to a corresponding long side of the slots, of between 0.2 and 0.4 mm.

2. The rotor as claimed in claim 1,
each principal face of the bars coming to bear against the bosses to immobilize by friction the bars within the laminations stack.

3. The rotor as claimed in claim 1, the bars being in contact with the opposite long sides of a slot only via the friction reliefs.

4. The rotor as claimed in claim 2, comprising a second material injected into the slots in the space left empty by the bars.

5. The rotor as claimed in claim 1, the stack of magnetic laminations comprising retaining laminations at axial ends of the stack, all the laminations of the stack being identical over the entire length of the stack, apart from the retaining laminations at the axial ends of the stack.

6. The rotor as claimed in claim 1, at least one lamination of the stack having at least one blocking relief that comes to bear against a radially exterior end face of a corresponding bar.

7. The rotor as claimed in claim 6, at least one lamination of the stack having two blocking reliefs opposite one another, each coming to bear against the same radially exterior end face.

8. The rotor as claimed in claim 1, at least one lamination of the stack having at least one blocking relief that comes to bear against a radially interior end face of a corresponding bar.

9. The rotor as claimed in claim 8, this blocking relief being centered on a median plane of the corresponding opening.

10. The rotor as claimed in claim 1, the slots being filled, around the bars with a second electrically conducting material, injected into the slots.

11. The rotor as claimed in claim 10, the second material extending into each slot radially both inwardly and outwardly with respect to the bar contained in this slot.

12. The rotor as claimed in claim 11, the second material coming into contact with the radially inner and radially outer end faces of the bars.

13. The rotor as claimed in claim 10, the second electrically conducting material being aluminum.

14. The rotor as claimed in claim 1, the first material being copper.

15. A rotary electric machine comprising a rotor as claimed claim 1.

* * * * *